United States Patent [19]

Corniere

[11] Patent Number: 5,345,160

[45] Date of Patent: Sep. 6, 1994

[54] VARIABLE FREQUENCY CONTROL SYSTEM FOR SINGLE PHASE INDUCTION MOTORS

[76] Inventor: Henri Corniere, 1611 W. 62nd Ave., Vancouver, B.C., Canada, V6P 2G1

[21] Appl. No.: 70,747

[22] Filed: Jun. 2, 1993

[51] Int. Cl.[5] .............................................. H02P 5/28
[52] U.S. Cl. .................................... 318/811; 318/727
[58] Field of Search ................................ 318/811, 727

[56] References Cited

U.S. PATENT DOCUMENTS

| | | | |
|---|---|---|---|
| 4,599,549 | 7/1986 | Mutoh et al. | 318/811 |
| 5,021,726 | 6/1991 | Reinhardt et al. | 318/811 |
| 5,081,409 | 1/1992 | Goff | 318/811 |
| 5,119,071 | 6/1992 | Takezawa et al. | 318/811 |
| 5,156,005 | 10/1992 | Redlich et al. | 318/811 |
| 5,235,264 | 8/1993 | Kaneda et al. | 318/727 |

*Primary Examiner*—William M. Shoop, Jr.
*Assistant Examiner*—Karen Masih
*Attorney, Agent, or Firm*—Shlesinger, Arkwright & Garvey

[57] ABSTRACT

A variable frequency controller for an induction motor which includes a variable frequency source of periodic electrical signals, a sinusoidal signal generator for generating a sinusoidal signal from an output of the variable frequency source of signals, and a pulse width modulated signal producer for producing pulse width modulated signals modulated by the sinusoidal signal. A signal separator for separating the modulated sinusoidal signal into two trains of half waves with the half waves in one train 180 degrees out of phase with those in the other train is also provided. An inverter bridge is coupled to the coil of an induction motor and connected across a DC voltage. A driver drives the inverter bridge with the modulated sinusoidal half waves so as to produce a substantially sinusoidal output current through said motor.

13 Claims, 6 Drawing Sheets

VARIABLE FREQUENCY CONTROL SYSTEM FOR SINGLE PHASE INDUCTION MOTORS

FIELD

The present invention relates to a circuit to power single phase alternating current induction motors which changes the frequency of applied voltage to the load in a controlled way so as to vary the speed of the motor to be controlled by simply changing the frequency of the AC supply source.

BACKGROUND

There are a large number of applications for motors which require variable speed such as the operation of electric tools, load lifting, fans, pumps, etc. Usually a mechanical device such as a gear box or belt is used to drive variable speed loads. Although induction motors are widely used in industry because of their ruggedness, high efficiency and low cost, their speed depends on the number of poles and the line frequency. Devices for changing the line frequency are not generally available and the number of poles is a fixed parameter.

Electric motors are ordinarily selected for specific applications compatible with speed and load requirements. In the case of induction motors, speed is directly related to the frequency of the line source. Such motors designed for use in North America have a rated frequency of 60 cycles. Increasing the frequency above the rated frequency will increase the speed but to maintain torque above the rated frequency of 60 cycles it is necessary to increase the voltage so as to keep the current/frequency ratio constant. However, the insulation of the windings will limit the voltage that can be applied so that a decreasing torque will result with increasing frequency beyond 60 cycles.

In normal operation, a motor works efficiently when it turns with a full load corresponding with its characteristics. However, a lightly loaded motor is relatively inefficient and has a corresponding poor power factor. Thus, it is desirable to reduce voltage whenever a motor is lightly loaded. Power consumption of such motors could be improved by providing a variable speed capability. Presently, variable speed is accomplished using belts or gears, assemblies which are expensive and cumbersome.

Currently, DC motors are another option for providing variable speeds. Such motors require batteries or large transformers if operated off of line voltage, thus creating an environmental problem upon disposal.

Accordingly, it is an object of the present invention to provide a simple, low cost method of varying the frequency of power used to drive induction motors.

SUMMARY OF THE INVENTION

According to the invention there is provided a variable frequency controller for an induction motor which includes a variable frequency source of periodic electrical signals, means for shaping the output signal from the variable frequency source into an approximate sinusoidal signal, and means for producing pulse width modulated signals modulated by said sinusoidal signal. Means are provided for separating the modulated sinusoidal signal into two trains of half waves. An inverter bridge is adapted to be coupled to the coil of an induction motor and connected across a DC voltage and means are provided for driving the inverter with the modulated sinusoidal half waves so as to produce a substantially sinusoidal output current through said motor.

The waveform shaping means may be a transconductance amplifier.

A flyback converter coupled to the DC source for producing auxiliary DC outputs may also be included.

The inverter bridge is preferably optically isolated from the modulating signal producing means.

The separating means may be a combination of NOR circuits.

Advantageously, the variable frequency source may be a voltage controlled oscillator.

Some advantages of the system are that it is relatively simple, reliable and cost effective. Only an accurate single power supply (12 V) and very few inexpensive ICs are required for implementing this scheme. Flexibility is provided in voltage and output power levels without changing the circuit arrangement. Small size, overload capacity and ease of insertion between AC power and the motor combine with ease of operation to make the present invention an attractive solution to a long-standing problem.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION WITH REFERENCE TO THE DRAWINGS

Figure 1:
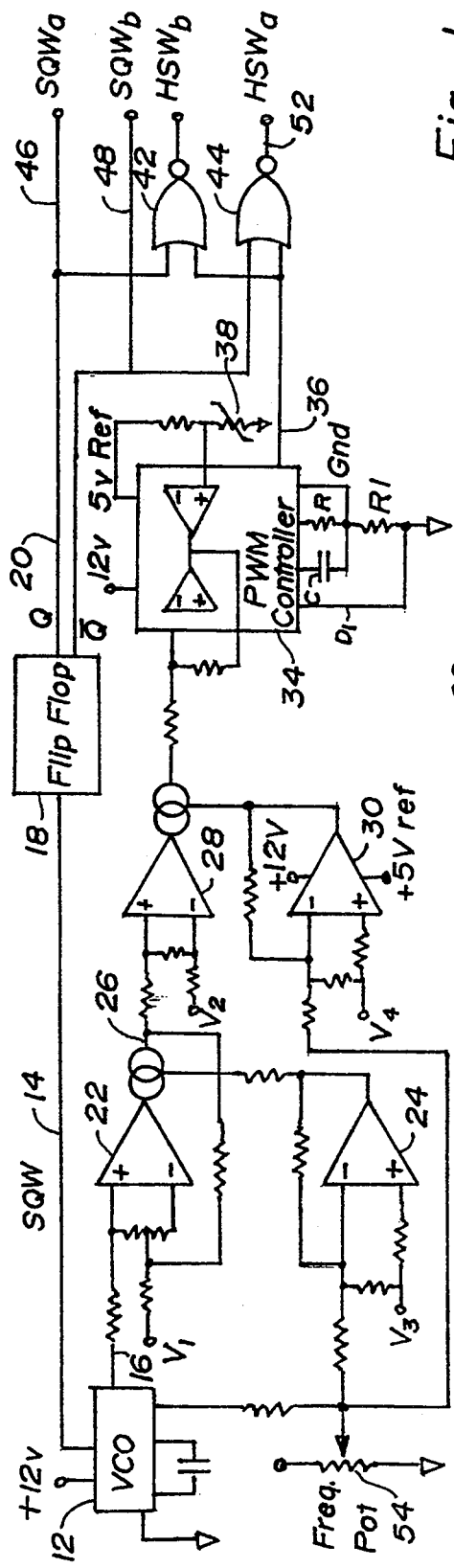
FIG. 1 is a schematic diagram of the variable frequency control system.
Figure 1:
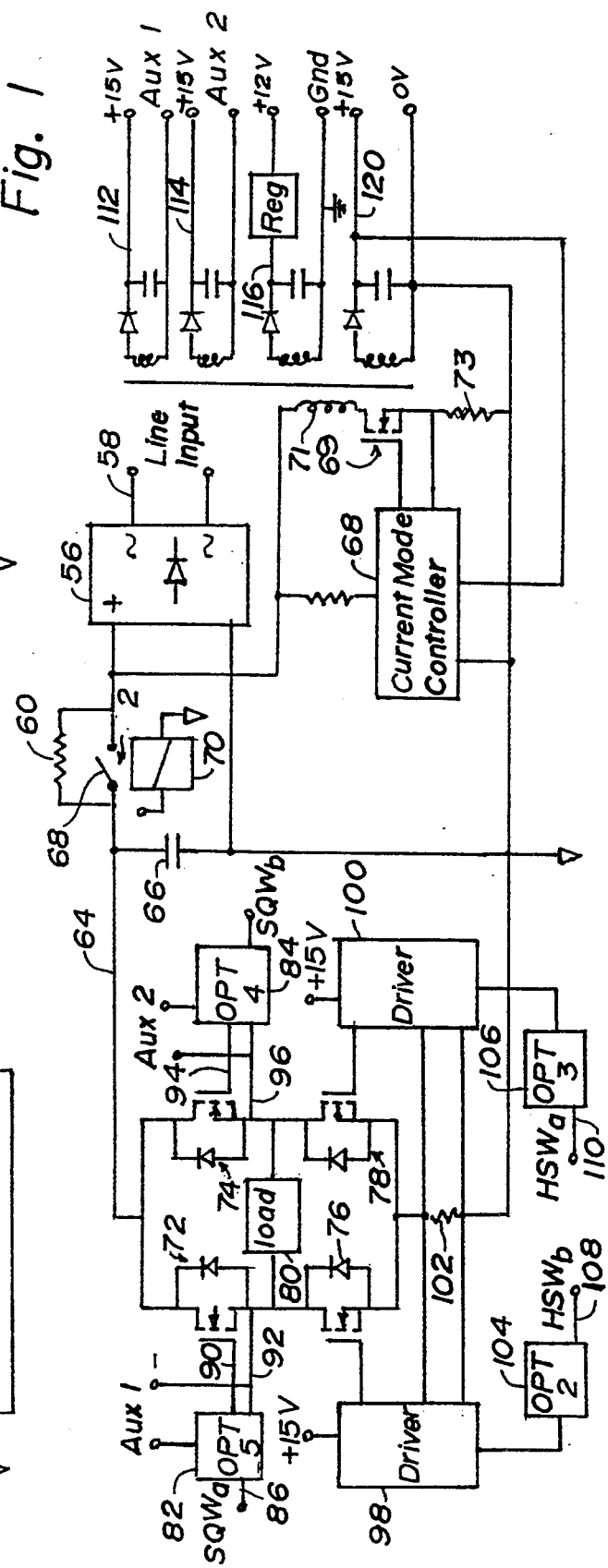

Referring to FIG. 1, the load 80 represents a single phase induction motor being driven from a line source at line input 58. The AC line voltage is rectified by a standard bridge rectifier unit 56 and stored on a large filter capacitor 66. The resistor $R_s$ 60 is a surge current protector to limit the surge current when voltage is first applied. A relay contact 68 controlled by relay coil 70 is in parallel with resistor 60 and closes a short time after start-up. The rectified voltage on line 64 is applied to a full bridge inverter consisting of power MOSFET's Q1, Q2, Q3, and Q4. Insulated gate bipolar transistors (IGBT) with additional free-wheeling diodes can be used in place of power MOSFET's.

Transistors Q2 and Q3 are driven by current limiting MOS gate drivers 98 and 100, respectively. The gate drivers 98 and 100 are current limiting MOS gate drivers which provide fast turn on rise time and therefore minimizes power dissipation on turn on. Transistors Q1 and Q4 are driven through optoisolators 82 and 88 which provide a Schmitt trigger output and further provide isolation of the controller from the bridge circuit. Similarly, optoisolators 104 and 106 isolate the controller from the drivers 98 and 100. The optoisolators 82 and 88 also achieve the necessary level shift of the control signals for transistors Q1 and Q4. This is accomplished with the two independent floating auxiliary supplies 112 and 114 tied to the sources transistors Q1 and Q4 at Aux 1 and Aux 2, respectively. A resistor R 102 of small value (typically 0.02 ohms for a 1 KVA power system) at the base of the bridge provides current protection to the transistors Q1, Q2, Q3, and Q4. The current through resistor 102 is sensed by drivers 98 and 100 which cause transistors 76 and 78 to turn off if the voltage across R exceeds a threshold value after a delay, thus preventing overstressing of all transistors by cycle by cycle current limiting when overloaded.

The circuit consisting of current mode controller 68, FET 69, and resistor 73 operates as a flyback converter. In this case the voltage at the output of the bridge rectifier 56 is applied to primary winding 71. Feedback is provided from line 120 to the current mode controller 68. The current mode controller 68 has a fast response to transients and line voltage drops which are inevitably present when the inverter is operating. The outputs from the lines 112, 114, 116, and 120 do not require inductors and, in view of the low power levels demanded at the output, no snubber for switching transistor protection is required. Since output 120 is referenced to 0 volts the controller 68 directly monitors its output without requiring an optoisolator. Line 116 has a series regulator 117 to provide a well regulated 12 volt output for the analog circuitry. The flyback arrangement results in a small size with minimal cost and protection against load and line changes and incoming transients.

The control signals used to drive the inverter bridge are developed by the circuit portion shown in the upper half of FIG. 1. A voltage controlled oscillator 12, powered by an auxiliary regulated 12 volt DC supply 119, generates both a square wave on line 14 and a sawtooth wave of the same frequency on line 16. DC supply 19 powers the entire circuit in the upper half of FIG. 1 and is isolated from the rest of the circuit. The frequency range is adjustable by frequency potentiometer 54 over the range of from 20 Hz to 400 Hz. The square wave on line 14 is represented as SQW in FIG. 5. This wave is divided by 2 by the flip flop 18 to generate a square wave at its Q output on line 20 shown as SQWa in FIG. 5. The signal on line 20 is input to a NOR circuit 42.

Figure 2:
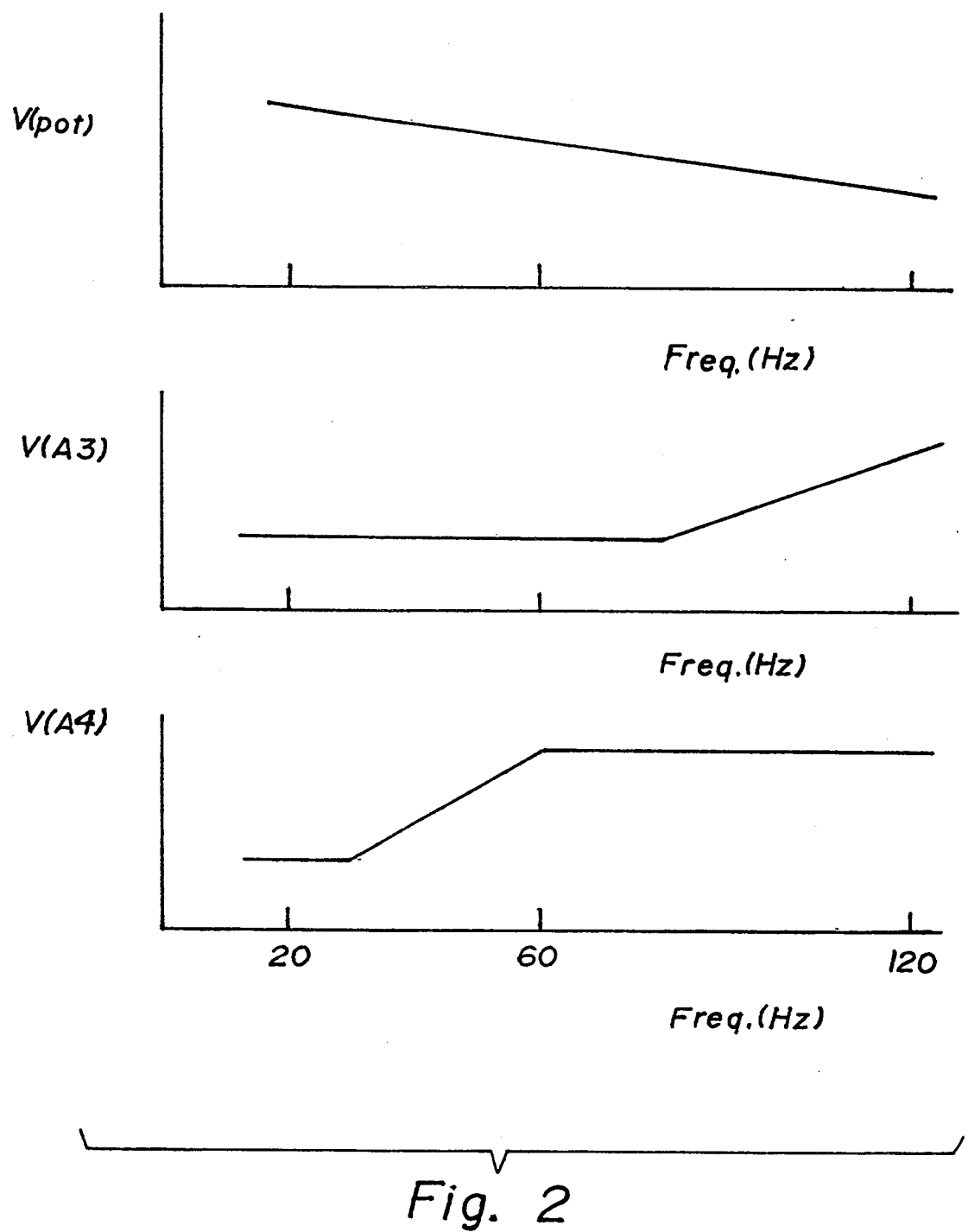
FIG. 2 is a set of waveform diagrams showing the voltage applied to the voltage controlled oscillator as a function frequency, the corresponding voltage output of the transconductance amplifier A3 and that at the output of the transconductance amplifier A4.
Figure 3:
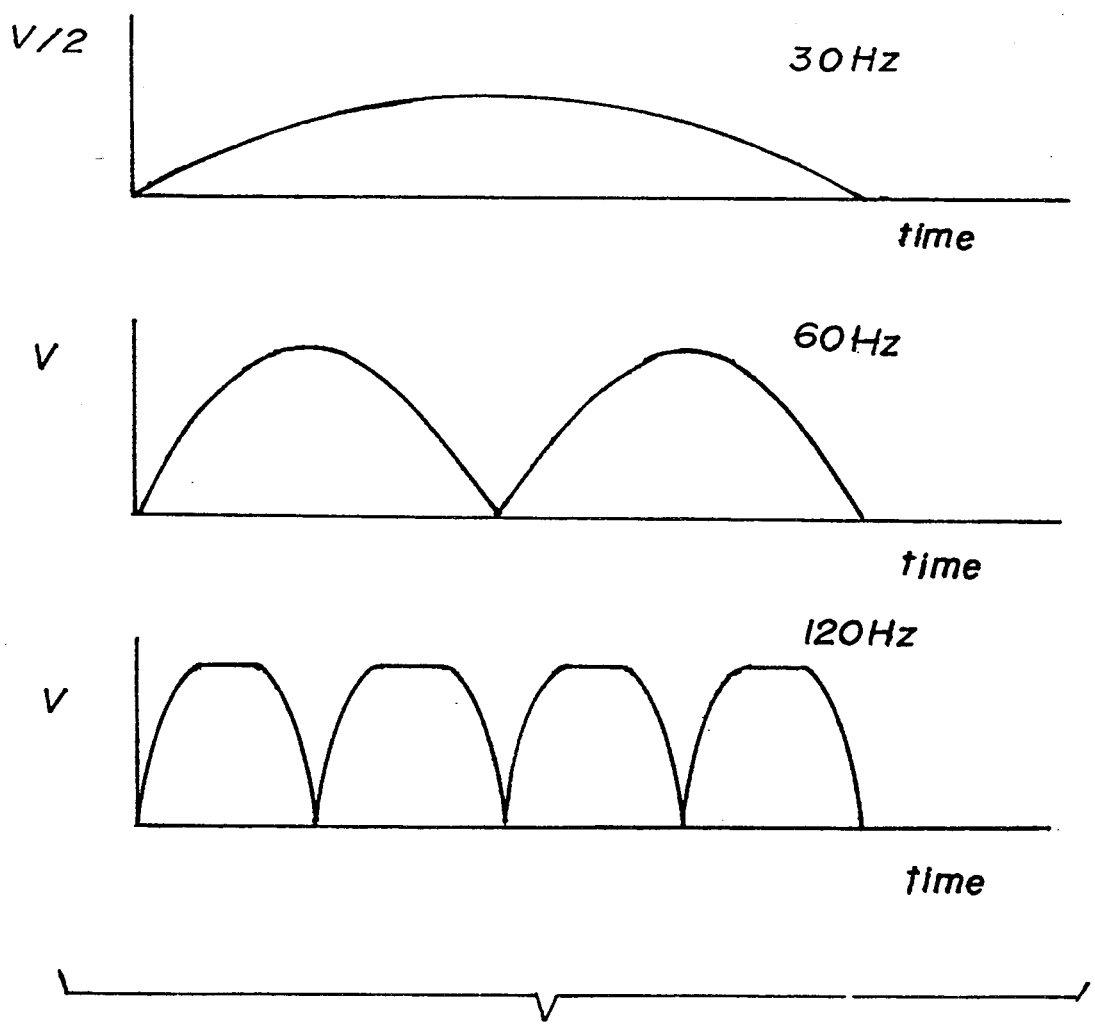
FIG. 3 is a set of waveforms of the signal driving the pulse width modulator as a function of frequency.

The sawtooth wave on line 16 is directed to an operational transconductance amplifier 22 which controls the amplitude while amplifier 24 varies the gain slightly when the frequency reaches 100 Hz and more as shown in the second graph of FIG. 2. Because this signal is positively offset and due to the operational transconductance amplifier's characteristics for large differential signals, transconductance amplifier 28 shapes the signal on line 26 into a good approximation of a half sine wave output on line 32 as shown in the three waveforms of FIG. 3 and the wave labelled HSW in FIG. 5. Inverting amplifier 30 varies the gain when the frequency covers the 50 to 120 Hz range, thus providing a constant voltage/frequency (V/F) ratio for frequencies below 60 Hz. The gain is held constant for frequencies below 25 Hz to ensure that there is some torque at very low speeds.

The pulse width modulator (PWM) 34 has an input coupled to line 32 and another non-inverting input is connected between a PCT thermistor 38 and a resistor to a reference voltage. The PCT thermistor is mounted close to the switching transistors Q1, Q2, Q3, and Q4 so as to sense the temperature of the latter transistors. If an excessive temperature is sensed, the signal produced on line 36 disables the driving signals $HSW_a$ and $HSW_b$, and shuts down the system. An internal dead-time Dt of the PWM which is problematic in the present application is eliminated by grounding the dead-time control pin and setting the ground level about 200 mV more positive with resistor R1.

Figure 5:
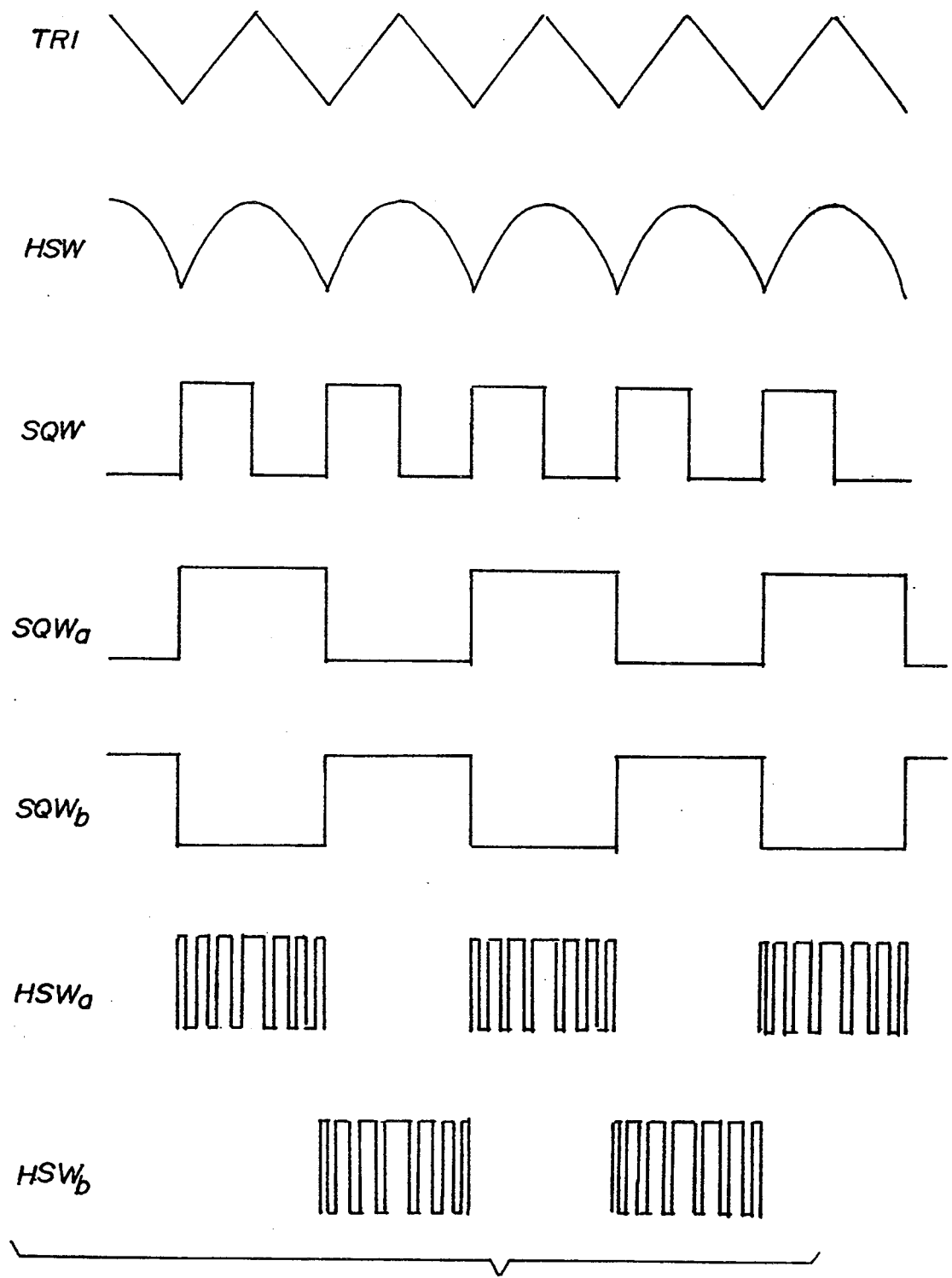
FIG. 5 is a set of waveforms at various locations of the circuit of FIG. 1.

In response to half sine wave input on line 32, the PWM 34 generates a series of pulses of a width which depends directly on the amplitude of the signal on line 32 as shown in FIG. 5 if one were to combine the signals $HSW_a$ and $HSW_b$. The resultant In response to half sine wave input on line 32, the PWM signal on line 36 is directed to NOR circuits 42 and 44 which split the series of have wave pulses into alternate sequences $HSW_a$ and $HSW_b$. The pulses $HSW_a$ and $HSW_b$ are applied to optoisolator circuits 106 and 104, respectively, drivers 100 and 98 and transistors Q3 and Q2, respectively. At the same time waves from lines 46 and 48 are applied to optoisolators 82 and 88 to drive transistors Q1 and Q4, respectively. Thus, on one half cycle transistor Q1 would be on and transistor Q3 would be driven on and off with varying time durations between transitions in accordance with the pulse width modulated signals $HSW_a$ on line 110, while on the next half cycle, transistor Q4 would be driven on by the $SQW_b$ signal on line 88 while transistor Q4 would be driven on and off by signal $HSW_b$ on line 108. The advantage of a full bridge arrangement such as the foregoing is that each transistor in the bridge is on only half the time. As a result of the inductive nature of the load, such signals would be smoothed out into a sinusoidal driving signal.

Figure 4:
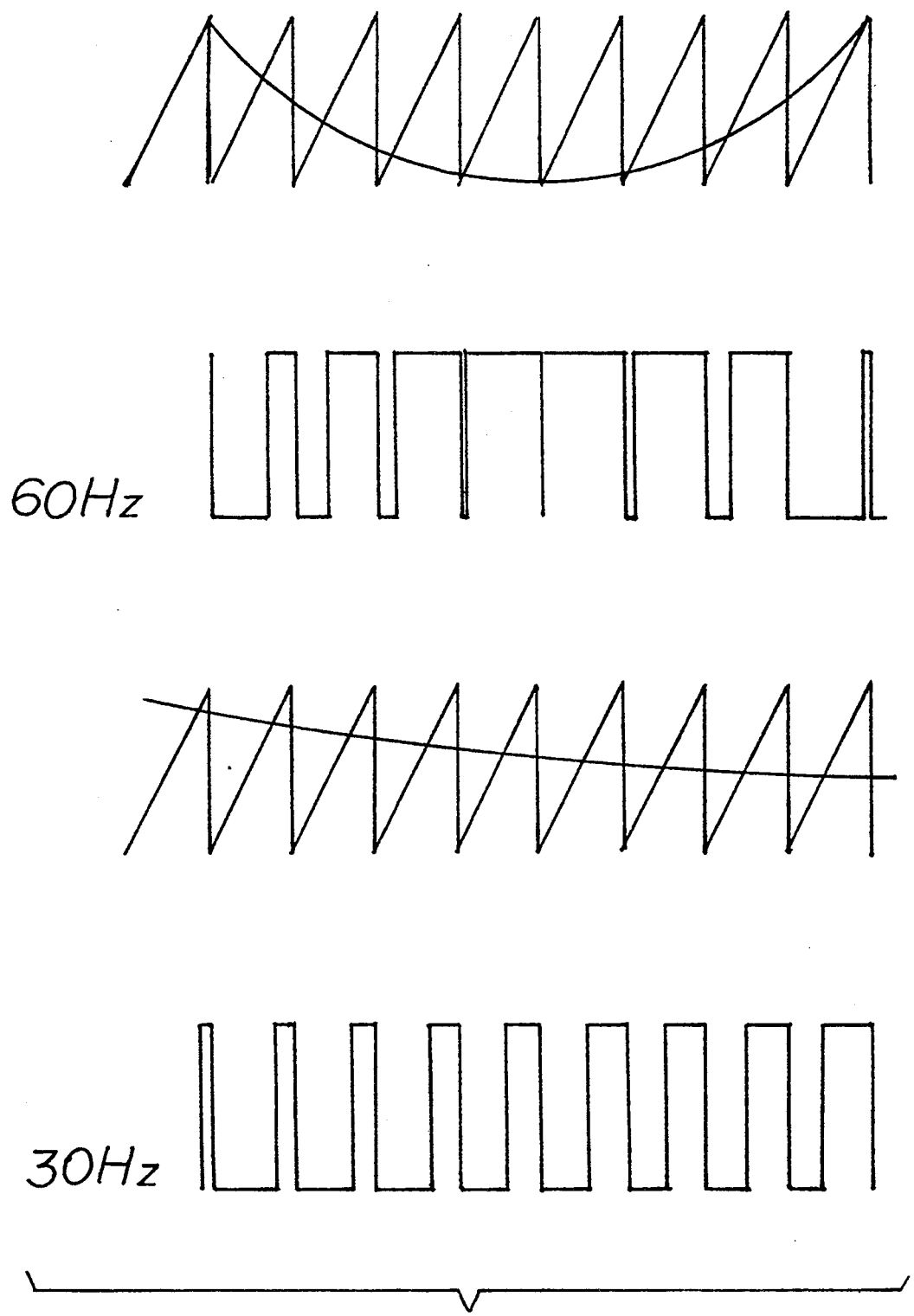
FIG. 4 is a set of waveforms synchronized as to time at various locations of the circuit of FIG. 1.

Referring to FIG. 4 there is shown an internal sawtooth wave generated internally by the pulse width modulator 34. In this case lowering the frequency of the input on line 32 is to cause the sawtooth wave to be sampled nearer the peaks of the individual pulses and so cause the output pulses to be of a narrower width. Thus, for the case shown the RMS value of the half sine wave of pulses is less and the current delivered correspondingly less.

Figure 6:
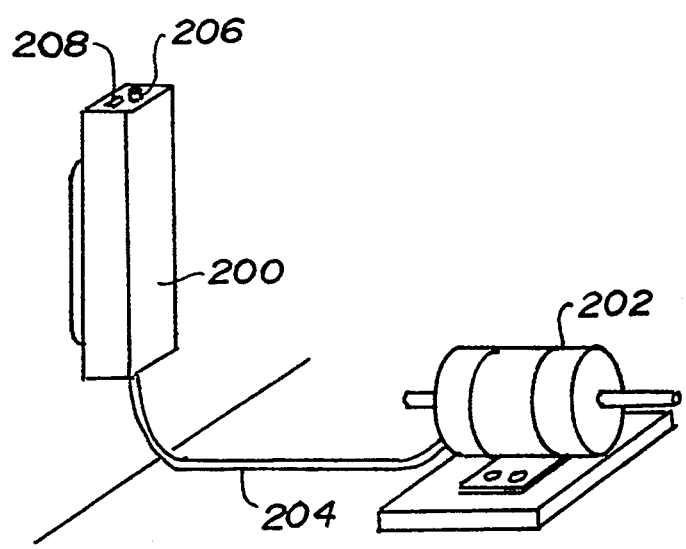
FIG. 6 is a perspective view of a variable frequency control device in accordance with the invention connected to a single phase induction motor.

Referring to FIG. 6 there is shown a small box 200 which contains the circuitry of FIG. 1 and which plugs into a standard wall socket. The box 200 connects between line voltage and the single phase induction motor 202 by cable 204. A knob 206 provides for varying the frequency of the circuit and indicator 208 indicates the operating frequency. In operation, changes in the frequency are accomplished by merely rotating the knob 206 which turns potentiometer 54 on box 200. This results in the induction motor speed changing correspondingly.

It will be appreciated that one could simply rectify a sine wave generated from a voltage controlled oscillator and use alternative cycles to gate the inverter bridge. However, there is a balance problem between the successive half cycles using such a technique. Such a problem is not present in the above-described procedure.

Accordingly, while this invention has been described with reference to illustrative embodiments, this description is not intended to be construed in a limiting sense.

Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

I claim:

1. A variable frequency controller for an induction motor, comprising:
   (a) a variable frequency source of periodic electrical signals;
   (b) means for generating an approximate sinusoidal signal from an output of said variable frequency source of signals;
   (c) means for producing pulse width modulated signals modulated by said sinusoidal signal:
   (d) means for separating the modulated sinusoidal signal into two trains of half waves with the half waves in one train 180 degrees out of phase with those in the other train;
   (e) an inverter bridge couplable to the coil of an induction motor and connected across a DC voltage; and
   (f) means for driving said inverter bridge with said modulated sinusoidal half waves so as to produce a substantially sinusoidal output current through said motor.

2. A controller according to claim 1, wherein said inverter is optically isolated from said modulating signal producing means.

3. A controller according to claim 1, wherein said separating means is a combination of NOR circuits.

4. A controller according to claim 1, wherein said variable frequency source is a voltage controlled oscillator.

5. A controller according to claim 1, wherein said sinusoidal signal producing means is a set of transconductance amplifiers which shape a sawtooth output from said variable frequency source means.

6. A controller according to claim 1, including a flyback converter coupled to said DC voltage for producing auxiliary DC outputs.

7. A variable frequency controller for an induction motor, comprising:
   (a) a voltage controlled oscillator having a square wave output and a sawtooth output;
   (b) a flip flop coupled to said square wave output and having a square wave output of ½ the frequency of said square wave output of said voltage controlled oscillator;
   (c) a source of variable voltage coupled to an input of said voltage controlled oscillator;
   (d) waveform shaping means for converting sawtooth pulses on said sawtooth output to approximate sinusoidal half waves;
   (e) a pulse width modulator controller (PWM) having an input coupled to an output of said waveform shaping means;
   (f) logic circuitry coupled to an output of said PWM and to an output of said flip flop;
   (g) a full wave inverter bridge driving an inductive load and connected across a DC source of voltage for producing two sets of sinusoidal half waves of pulse width modulated signals 180 degrees out of phase; and
   (h) means for coupling one of said sets of sinusoidal half waves of signals to one side of said bridge and another of said set to the other side of said bridge so as to trigger one side of said bridge on during one half cycle and the other side on during the other half cycle.

8. A controller according to claim 7, wherein said waveform shaping means is transconductance amplifier.

9. A controller according to claim 7, including a flyback converter coupled to the DC source for producing auxiliary DC outputs.

10. A controller according to claim 7, wherein said inverter bridge is optically isolated from said modulating signal producing means.

11. A controller according to claim 7, wherein said separating means is a combination of NOR circuits.

12. A controller according to claim 7, wherein said variable frequency source is a voltage controlled oscillator.

13. A controller according to claim 7, wherein said sinusoidal signal producing means is a set of transconductance amplifiers which shape a sawtooth output from said variable frequency source means.

* * * * *